United States Patent [19]

Hein et al.

[11] Patent Number: 5,158,269

[45] Date of Patent: Oct. 27, 1992

[54] DUAL/SLIPPER SHOCK MOUNT

[75] Inventors: Richard D. Hein, Wabash; Bradley G. Hampton, Tipton; Tony R. Jones, Walton; James R. Goewey, Marion, all of Ind.

[73] Assignee: GenCorp Inc., Fairlawn, Ohio

[21] Appl. No.: 595,888

[22] Filed: Oct. 11, 1990

[51] Int. Cl.$^5$ .............................................. F16F 3/08
[52] U.S. Cl. .................................. 267/220; 188/321.11; 248/635; 267/141.1; 267/140.3; 267/292; 267/294; 267/153; 267/33; 280/716; 403/225; 403/365
[58] Field of Search ............... 267/220, 219, 292, 293, 267/294, 140.3, 140.5–141.7, 280, 281, 137, 152, 153, 33, 35, 134–135, 201–207, 122, 140; 188/321.11; 280/668, 661, 662, 697, 710, 716, 692, 712, 671; 248/638, 632, 635

[56] References Cited

U.S. PATENT DOCUMENTS

| | | | |
|---|---|---|---|
| 1,732,646 | 10/1929 | Flintermann | 267/141.3 |
| 2,165,702 | 7/1939 | Haushalter | 403/228 X |
| 2,212,153 | 8/1940 | Eaton et al. | 403/227 X |
| 2,506,725 | 5/1950 | Magrum | 267/293 X |
| 2,611,278 | 9/1952 | Turnbull | 403/365 X |
| 2,731,258 | 1/1956 | Dentler | 267/202 |
| 2,815,201 | 12/1957 | Eymer | 267/203 |
| 2,858,127 | 10/1958 | Moulton | 267/293 |
| 3,055,687 | 9/1962 | Hutton | 403/228 X |
| 3,322,377 | 5/1967 | Morlon | 267/153 X |
| 3,831,920 | 8/1974 | Meldrum et al. | 267/153 X |
| 4,176,714 | 12/1979 | Case | 267/153 X |
| 4,298,193 | 11/1981 | Mourray | 280/668 X |
| 4,391,436 | 7/1983 | Fishbaugh | 267/141.1 |
| 4,415,146 | 11/1983 | Sitko | 267/202 X |
| 4,434,977 | 3/1984 | Chiba et al. | 267/220 X |
| 4,478,396 | 10/1984 | Kawaura | 267/33 X |
| 4,577,842 | 3/1986 | Shtarkman | 267/35 X |
| 4,741,521 | 5/1988 | Schiffner et al. | 267/293 X |
| 4,804,169 | 2/1989 | Hassan | 267/33 X |
| 4,810,003 | 3/1989 | Pinch et al. | 267/33 X |
| 4,840,357 | 6/1989 | Jouade | 267/219 X |
| 4,858,896 | 8/1989 | Colford | 267/219 X |
| 4,893,799 | 1/1990 | DeFontenay | 267/140.1 C |
| 4,921,203 | 5/1990 | Peterson et al. | 267/141.1 X |
| 4,955,588 | 9/1990 | Reuter et al. | 267/219 X |
| 4,971,296 | 11/1990 | Kondo | 280/668 X |

FOREIGN PATENT DOCUMENTS

| | | | |
|---|---|---|---|
| 142128 | 8/1949 | Australia | 267/207 |
| 452673 | 11/1948 | Canada | 267/141.1 |
| 19533 | 11/1980 | European Pat. Off. | 267/141.1 |
| 847385 | 8/1952 | Fed. Rep. of Germany | 267/293 |
| 3316870 | 2/1984 | Fed. Rep. of Germany | 267/153 |
| 2596125 | 9/1987 | France | 267/141.1 |
| 466354 | 5/1937 | United Kingdom | 267/141.1 |
| 535096 | 3/1941 | United Kingdom | 267/293 |
| 793772 | 4/1958 | United Kingdom | 267/35 |
| 1206895 | 9/1970 | United Kingdom | 267/293 |
| 2193784 | 2/1988 | United Kingdom | 267/153 |
| 2202028 | 9/1988 | United Kingdom | 267/153 |

Primary Examiner—Douglas C. Butler

[57] ABSTRACT

A shock absorber mount is described as having two pressed fittings which are mounted in end-to-end relationship. Each insert has two rigid, radially spaced cylindrical sleeves which are separated by a resilient rubber insert. The inner sleeve of the vertically lowermost fitting, when the fittings are properly mounted on, for example, an automobile frame, extends upwardly beyond the associated outer sleeve and is coated with rubber to enter a hollow bore formed by the inner sleeve of the upper fitting. The extension allows the lower fitting to initially absorb an upwardly applied axial force until it moves into shock absorbing relation with the upper fitting. The extension also acts to bolster the radial shock absorbing characteristics of the upper fitting to provide improved shock absorbing characteristics of the mount; namely, low axial shock absorption and high radial shock absorption.

12 Claims, 2 Drawing Sheets

DUAL/SLIPPER SHOCK MOUNT

BACKGROUND OF INVENTION

The invention relates to a shock dampening mount which employs resilient elastomeric cushions, especially a mount which is positioned between a conventional shock absorber and an automobile frame. Two important parameters for designing such a mount are, 1) a low axial rate of shock absorption to control noise and vibration entering the passenger compartment, and 11) a high radial rate of shock absorption to provide better vehicle handling. The invention successfully incorporates both of these parameters.

Briefly stated, the invention is in a shock absorbing mount which comprises two pressed metal/elastomeric parts which are mounted together in end-to-end relation. Each part has a pair of concentric cylindrical metal sleeves which are radially spaced about a vertical axis when the parts are vertically disposed in stacked relation. A resilient elastomeric insert is secured between each pair of metal sleeves. The inner sleeve of the vertically lowermost part extends beyond the outer sleeve thereof for slidable receipt in the bore formed by the hollow inner sleeve of the vertically uppermost part. The extension of the inner sleeve of the lower part is covered with rubber which can be coated with a substance to decrease the friction between the rubber on the extended lower inner sleeve and the inner sleeve of the upper part. The parts are designed so that the lower part will move axially upward a short distance before engaging the top part to provide the lowest possible axial rate of shock absorption. Further, the lower sleeve extension buttresses or reinforces the upper part to increase the rate of shock absorption in a radial direction.

These two parts like those of copending application Ser. No. 07/590,762, filed Oct. 1, 1990 are simplistic in design, so that they are easily assembled and inexpensive to manufacture.

DESCRIPTION OF DRAWING

The following description of the invention will be better understood by having reference to the accompanying drawing, wherein.

DETAILED DESCRIPTION OF DRAWING

Figure 1:
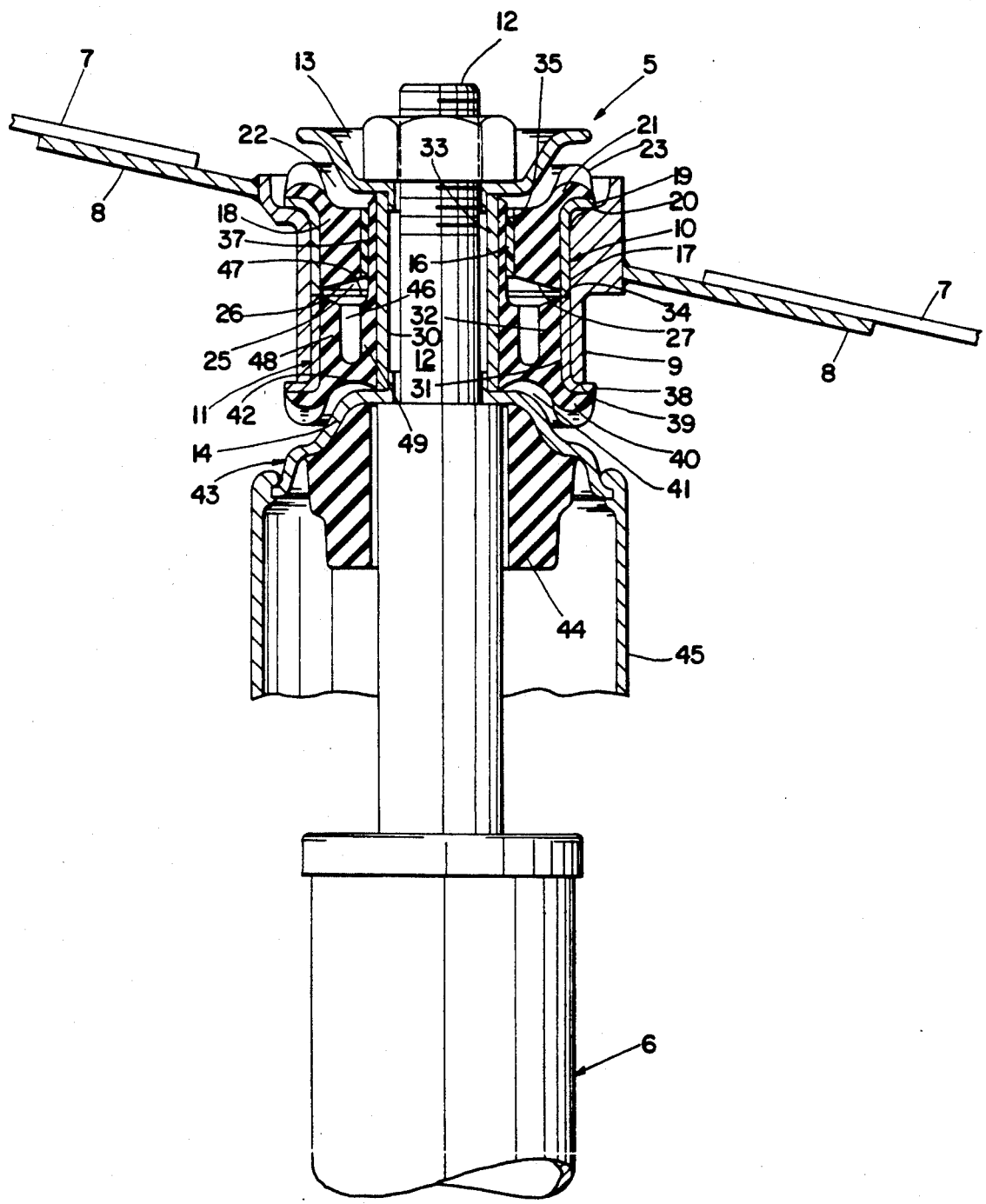
FIG. 1 is an assembly drawing of a shock absorbing mount which is made in accordance with the invention, the parts of the mount being shown in cross-section.

With reference to the drawing, there is shown a shock absorbing mount 5 for securing a conventional shock absorber 6 to an automobile frame 7. The mount 5, when assembled in vertical relation as represented in FIG. 1, comprises a metal mounting plate 8 which is secured to the adjacent automobile frame 7, the plate 8 having a vertically disposed, hollow cylindrical housing 9 for receiving a pair of upper and lower pressed metal/elastomeric parts or fittings 10, 11 which surround the upper shaft 12 of the shock absorber 6, and which are held there in the housing 9 by a pair of vertically spaced metal washers 13, 14 and lock nut 15.

The upper pressed fitting 10 comprises a pair of concentrically disposed rigid cylindrical sleeves 16, 17, which are radially spaced by an annular insert 18 which is composed of any suitable resilient elastomeric material, e.g. rubber. The upper end 19 of the outer sleeve 17 is curved or flared outwardly to rest on the adjacent, upper curved end 20 of the housing 9 to limit travel of the upper pressed fitting 10 in the direction of the lower pressed fitting 11. The upper, radially outermost end 21 of the rubber insert 18 is matingly curved to rest atop the outwardly curved end or flange 19 of the outer sleeve 17. An annular rubber collar 22, integral with the rubber insert 18, is formed atop the insert 18 and flange 21, and is provided with a corrugated outer end 23 for engaging the upper metal washer 13, depending on the transitional design parameters desired between the upper washer 13 and abutting upper pressed fitting 10. The vertically lowermost end 24 of the rubber insert 18 is provided with an inwardly directed void or cavity 25, which is formed by opposing sidewall sections 26, 27 which are tapered and converge in the direction of the upper washer 13. The inner sleeve 16 of the upper pressed fitting 10 is shorter than the outer sleeve 17 and is composed of either metal or plastic and, in this instance, is formed of plastic to enhance slippage between the upper and lower pressed fittings 10, 11, as will become apparent from the description of the lower pressed fitting 11.

Figure 2:
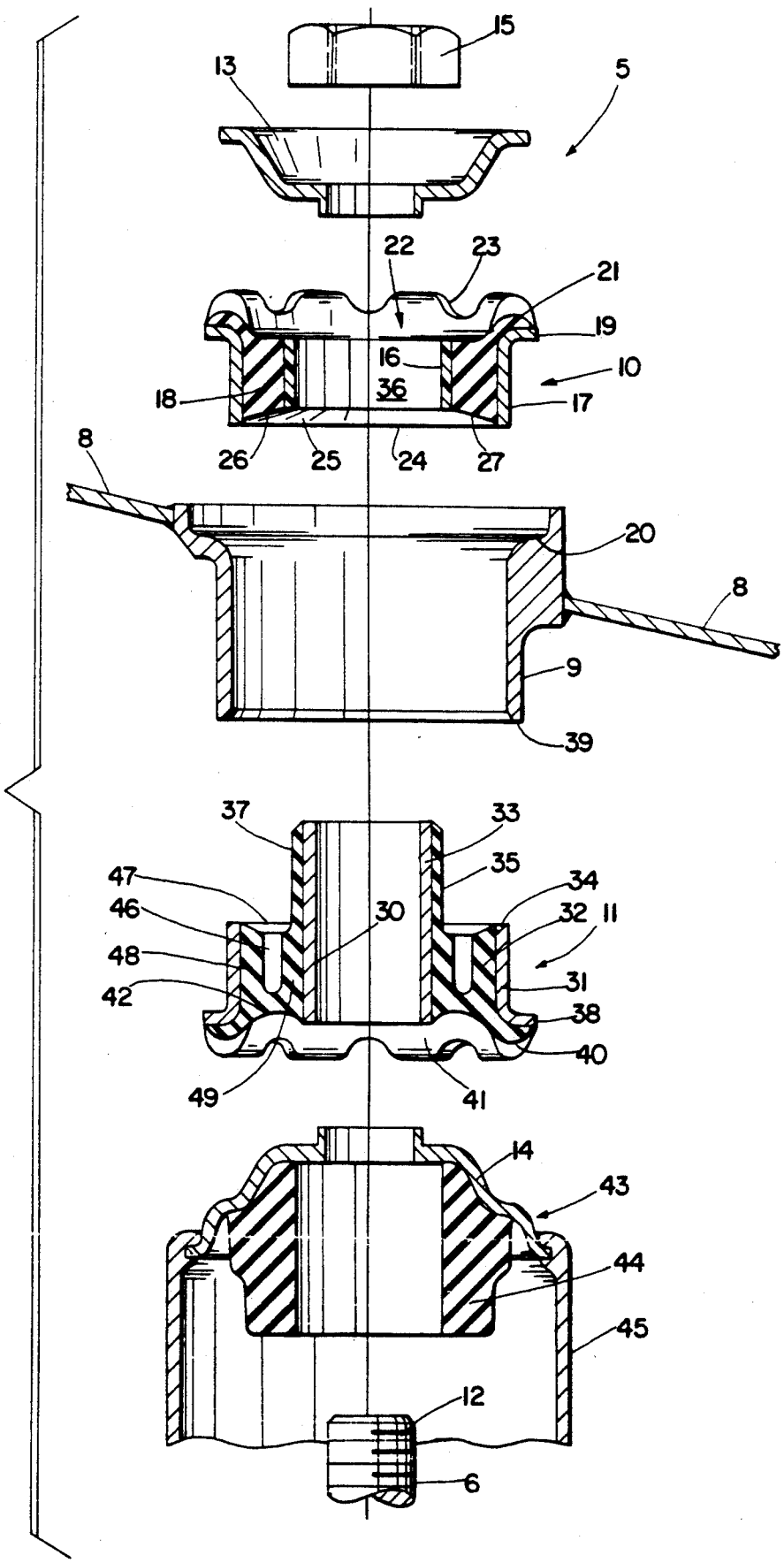
FIG. 2 is an exploded view of the mount, also showing the parts in cross-section.

The lower pressed fitting 11 also has a pair of rigid, radially spaced, concentric inner and outer cylindrical metal sleeves 30, 31 between which is a rubber insert 32. The lower inner sleeve 30 is substantially longer than the lower outer sleeve 31 to form an inner sleeve extension 33 which extends beyond the upper rim 34 of the lower outer sleeve 31. The inner sleeve extension 33 is covered by a thin layer 35 of rubber which is integral with the rubber insert 32. The rubber coated sleeve extension 33 is designed to be slidably received in the bore 36 formed inside the hollow inner plastic sleeve 16 of the upper pressed fitting 10. To further enhance slippage between these two parts, the outer cylindrical rubber surface 37 of the sleeve extension 33 can be coated with any suitable material which further reduces the coefficient of friction between the upper plastic sleeve 16 and the lower sleeve extension 33. The lower end 38 of the lower outer sleeve 31 is flared radially outwardly to form an annular flange which engages the adjacent lower end 39 of the housing 9 to limit travel of the lower pressed fitting 11 in the direction of the upper pressed fitting 10. The lower end 40 of the lower rubber insert 32 is matingly curved to rest against the lower curved flange 38 of the lower outer sleeve 31. A corrugated rubber collar 41 is also provided at the lower end 42 of the lower rubber insert 32 to engage the adjacent lower metal washer 14 which, in this instance, is a conventional jounce bumper 43 which includes a cylindrical rubber shock absorber 44 and surrounding dust tube 45, and which is not a part of the invention. The lower rubber insert 32 is provided with an annular void or cavity 46 which extends inwardly of the insert 32 from the upper end 47 of the insert 32 closest the upper pressed fitting 10. The thickness of the sidewalls 48, 49 forming the cavity 46, may vary, as best seen in FIG. 2.

The shock absorbing mount 5 is designed such that the lower pressed fitting 11 will move a predetermined axial distance, e.g. 3 millimeters, before it encounters or engages the upper pressed fitting 10. Thus, it can be appreciated by those skilled in the art that the initial shock vertically imposed axially upwardly against the shock absorber mount 5, will be absorbed entirely by the slideable lower pressed fitting 11 to minimize shock absorption in an axial direction in accordance with the aforementioned first important design parameter. The lower, outer sleeve extension 33 within the bore 36 of the upper pressed fitting 10, acts to bolster or reinforce the radial shock absorbing capabilities of the upper pressed fitting 10 as it coacts with the lower pressed fitting 11, to maximize the radial shock absorbing characteristics of the mount 5 in accordance with the second design parament outlined above.

Thus, there has been described a mount which has a unique sleeve extension which allows axial slippage between the pressed, shock absorbing fittings of the mount, as well as increases the radial shock absorbing characteristics of the fittings. It is believed that this unusual design and interaction of the fittings optimises the two import design characteristics desired in a mount of this type; namely, a low shock absorption in an axial direction and a high shock absorption in a radial direction.

The shock absorbing rate of the mount can be adjusted or tuned by varying the composition of the rubber insert, or by varying the size, location, or geometric shape of the cavities in the rubber insert, or by varying the size or geometric shape of the sleeves to which the rubber units are secured.

What is claimed is:

1. A shock absorbing mount comprising a pair of shock absorbing fittings disposed in end-to-end concentric relation, each of the fittings comprising a pair of radially spaced rigid cylindrical sleeves with a resilient elastomeric annular insert compressed between them, the mount including means coacting between the fittings for allowing relative axial movement of the fittings towards each other a predetermined distance before engagement of the inserts, while maintaining the fittings in unitary shock absorbing relation against forces applied radially inwardly against outer sleeves of the fittings, wherein the means includes one of the fittings having a bore within the inner sleeve thereof for slidably receiving a rigid inner sleeve extension of the other fitting, the sleeve extension being surrounded by an annular resilient elastomeric extension of the insert of the other fitting, the resilient elastomeric extension being in slidable contact with the inner sleeve of said one fitting.

2. The shock absorbing mount of claim 1, which includes means for enhancing slidable contact between the elastomeric extension and adjacent inner sleeve.

3. A shock absorbing mount, comprising a vertically uppermost shock absorbing fitting in end-to-end concentric relation with a vertically lowermost shock absorbing fitting, when the fittings are mounted together in vertical relation, one of the fittings comprising:

a) a pair of rigid, cylindrical sleeves concentrically disposed around a vertical axis, including an outer sleeve radially spaced from the axis a distance farther than a hollow inner sleeve, the end of the outer sleeve farthest from the other insert being curved radially outwardly from the axis to form a flange for engaging an adjacent end of a mounting plate housing to limit travel of the outer sleeve in the direction of the other fitting, a hollow axial bore being formed within the inner sleeve;

b) a resilient elastomeric annular insert secured between the sleeves, the insert having an annular flange portion which is matingly curved to rest against the flange of the outer sleeve; and the other of the fittings comprising;

c) a pair of cylindrical rigid sleeves concentrically disposed around the vertical axis, including an outer sleeve which is vertically aligned with the outer sleeve of the one fitting and which has an end farthest spaced from the one fitting, which is curved radially outwardly from the axis to form a flange for engaging an opposite end of the housing to limit travel of the outer sleeve in the direction of the one fitting, and which is radially spaced from the axis a distance which is greater than that of an inner sleeve which is longer, measured axially, than the outer sleeve to form an inner sleeve extension which extends beyond the outer sleeve for slidable receipt in the bore of the one fitting; and d) a resilient elastomeric annular lower insert secured between the inner and outer sleeves, including an integral layer of elastomer surrounding the inner sleeve extension for receipt in the bore with the extension, the insert having an annular flange portion which is matingly curved to rest against the outermost surface of the flange of the outer sleeve, the fittings being positioned on the mount such that when an axial force is applied upwardly against the vertically lowermost fitting, the lower fitting will initially absorb the force until it moves axially into shock absorbing engagement with the upper fitting, the sleeve extension coacting to cause unitary shock absorption of the fittings against a radial force applied thereagainst.

4. The shock absorbing mount of claim 3, wherein the sleeve extension is on the vertically lowermost fitting and which includes:

e) means for reducing the coefficient of friction between the inner sleeve of the upper fitting and the adjacent cylindrical elastomeric surface of the lower sleeve extension.

5. The shock absorbing mount of claim 4, wherein the means (e) includes a substance, applied to the outer cylindrical surface of the elastomer surrounding the extension, for increasing slippage between the inner sleeve of the upper fitting and the outer, cylindrical rubber surface of the extension.

6. The shock absorbing mount of claim 4, wherein the means (e) includes a plastic inner sleeve of the upper fitting.

7. The shock absorbing mount of claim 3, wherein the lower insert includes an annular cavity extending inwardly of the insert from the end of the insert confronting the insert of the upper fitting.

8. The shock absorbing mount of claim 7, wherein the insert of the upper fitting includes an annular cavity which extends inwardly of the insert around the outer elastomeric surface of the extension from the end of the insert confronting the lower insert.

9. The shock absorbing mount of claim 8, wherein the inserts at their farthest spaced opposing ends include elastomeric collars which are integral with the inserts, and which have farthest spaced opposing ends which are corrugated for engaging metal washers between which the fittings are mounted.

10. The shock absorbing mount of claim 9, wherein the inner sleeve of the upper fitting is composed of plastic, and the inserts are composed of rubber.

11. A shock absorbing mount, comprising a vertically uppermost shock absorbing pressed fitting in end-to-end concentric relation with a vertically lowermost shock absorbing pressed fitting, when the fittings are mounted together in vertical relation, the upper fitting comprising:

a) a pair of rigid, cylindrical sleeves concentrically disposed around a vertical axis, including a metal outer sleeve radially spaced from the axis a distance farther than a plastic inner sleeve which is closer the axis and which is shorter, in length, measured axially than the outer sleeve which has a vertically uppermost end which is curved outwardly from the axis to form an outstanding flange which is designed to engage an adjacent part of a surrounding cylindrical metal housing to limit axial movement of the outer sleeve in the direction of the lower fitting, a hollow bore being formed within the plastic inner sleeve;

b) a resilient, annular rubber insert separating the sleeves and secured therebetween, the insert having a vertically lowermost annular end which slopes inwardly of the insert between the vertically lowermost circular ends of the outer metal sleeve and the shorter inner plastic sleeve, the insert having a vertically uppermost end which includes, (1) a radially outwardly extending flange which is matingly shaped to rest atop the flange of the outer metal sleeve, and 11) a collar having a vertically uppermost annular end which is corrugated to engage a first metal washer; and the lower fitting comprising:

c) a pair of rigid, cylindrical metal sleeves concentrically disposed around the axis, including a lower outer sleeve which is vertically aligned with the outer sleeve of the upper fitting, and which has a vertically lowermost end which is curved radially outwardly from the axis to form an outstanding flange which is designed to engage an adjacent portion of the metal housing to limit axial movement of the lower outer sleeve in the direction of the upper fitting, the lower outer sleeve being farther radially spaced from the axis than a lower inner sleeve which extends upwardly beyond the lower outer sleeve to form a rigid, cylindrical, metal extension for slidable receipt in the bore of the upper fitting; and d) a lower resilient, annular rubber insert separating the lower sleeves and secured therebetween, the lower rubber insert including an integral layer of rubber surrounding the extension of the lower inner sleeve and secured thereto for receipt in the bore with the extension, the outer diameter of the rubber coated extension being slightly smaller than the inside diameter of the bore to permit sliding therebetween, the lower rubber insert having a vertically lowermost end which includes, III) a radially outwardly extending flange which is matingly shaped to rest against the vertically lowermost surface of the flange of the lower outer sleeve, and IV) a collar having a vertically lowermost annular end which is corrugated to engage a second metal washer, the fittings being mounted between the first and second metal washers; and the lower insert having an annular cavity extending therein from the end of the lower insert confronting the upper fitting, the size and shape of the cavity in the lower insert being correlated to the shock absorbing characteristics desired of the lower fitting; the fittings being designed such that when an axial force is applied upwardly against the lower fitting, the lower fitting will initially absorb the force until it moves axially into shock absorbing coaction with the upper fitting and, when a radial force is applied against the fittings, the extension will bolster and reinforce the shock absorbing characteristics of the upper fitting.

12. The shock absorbing mount of claim 11, which includes:

e) means for reducing the coefficient of friction between the inner sleeve of the upper fitting and the adjacent cylindrical rubber surface of the lower inner sleeve extension.

* * * * *